United States Patent [19]

Chandler

[11] 3,977,921

[45] *Aug. 31, 1976

[54] PRIMING NITROMETHANE

[75] Inventor: Ollie Wayne Chandler, Terre Haute, Ind.

[73] Assignee: IMC Chemical Group, Inc., Terre Haute, Ind.

[ * ] Notice: The portion of the term of this patent subsequent to Feb. 26, 1991, has been disclaimed.

[22] Filed: Jan. 6, 1975

[21] Appl. No.: 538,622

Related U.S. Application Data

[60] Continuation-in-part of Ser. No. 442,014, Feb. 13, 1974, abandoned, which is a division of Ser. No. 333,845, Feb. 20, 1973, Pat. No. 3,794,534.

[52] U.S. Cl.......................................... 149/2; 149/89

[51] Int. Cl.² .......................................... C06B 45/00
[58] Field of Search ................................. 149/2, 89

[56]  References Cited
UNITED STATES PATENTS

| | | | |
|---|---|---|---|
| 3,794,534 | 2/1974 | Chandler | 149/2 |
| 3,902,933 | 9/1975 | Chandler | 102/27 R |

*Primary Examiner*—Stephen J. Lechert, Jr.
*Attorney, Agent, or Firm*—Robert H. Dewey; Howard E. Post

[57] ABSTRACT

A method for priming nitromethane to strong shock which comprises immersing in said nitromethane an open-celled polymeric foam and a blasting cap in close contact with said polymeric foam.

6 Claims, No Drawings

PRIMING NITROMETHANE

CROSS-REFERENCE TO RELATED APPLICATIONS

This application is a continuation-in-part of applicant's copending application Ser. No. 442,014 filed Feb. 13, 1974, now abandoned, which was a division of application Ser. No. 333,845 filed Feb. 20, 1973 which issued as U.S. Pat. No. 3,794,534 on Feb. 26, 1974.

BACKGROUND OF THE INVENTION

This invention relates to an explosive combination. In a particular aspect this invention relates to a primer adapted to initiating detonation of nitromethane by strong shock.

Nitromethane is a very stable liquid but it can be detonated under extraordinary conditions. When it does detonate, it is extremely powerful and is useful in many special applications. However the difficulty in initiating detonation has long been a problem, often requiring expensive primers and boosters.

It is known from Minnick, U.S. Pat. No. 3,338,165 that insoluble air-entrapping materials, such as resin balloons, can be uniformly suspended in gelled nitromethane and thereby render it sensitive to detonation by strong shock. It is necessary to gel the nitromethane because otherwise the air-entrapping material will segregate whereupon the composition loses its sensitivity to strong shock and does not detonate when the initiator is fired.

The compositions disclosed by Minnick are satisfactory when freshly prepared but they suffer from several disadvantages. For field use, it is inconvenient, if not impossible, to gel the nitromethane at the site of use and uniformly mix in the air-entrapping material. It is possible to prepare the composition ahead of time and transport it to the site, but it has been found that the composition loses its sensitivity on aging, possibly due to displacement of the entrapped air by nitromethane. Also it is risky to transport a shock-sensitive explosive mixture under field conditions. Furthermore, once the composition has been prepared, it cannot be easily desensitized if it is not used promptly.

Accordingly, there is a need for an improved method for detonating nitromethane.

SUMMARY OF THE INVENTION

It is an object of this invention to provide an explosive composition.

It is another object of this invention to provide a primer adapted to initiating detonation of nitromethane by strong shock.

Other objects of this invention will be apparent to those skilled in the art from the description herein.

It is the discovery of this invention that an open-celled polymeric foam placed in intimate contact with nitromethane provides an explosive system sensitive to detonation by strong shock. The foam and the nitromethane in intimate contact with it function as a primer for detonating the remaining nitromethane and provide a method for priming nitromethane to detonation by strong shock to which it would otherwise be stable.

DETAILED DESCRIPTION

According to the present invention, when nitromethane is to be detonated, the polymeric foam is placed in intimate contact with a suitable shock-producing device, e.g. an electric blasting cap. The cap and foam are then placed in intimate contact with the nitromethane, e.g. by immersion, or by placing in a capwell or tube and then immersing. If a capwell is used, care must be taken to see that nitromethane can enter the capwell and be in contact with the foam. When the cap is fired, it results in detonation of the nitromethane.

The primer of the present invention is particularly advantageous because the nitromethane remains highly stable and unsensitized until the foam is immersed therein. Furthermore, the foam can be easily removed prior to detonation, if desired, leaving the nitromethane unsensitized. The foam is also easily produced and suitable foams can be easily purchased at retail.

The polymeric foam can be any open-celled foam which is partially, but not wholly, impermeable to nitromethane. It is necessary that the foam absorb some nitromethane but not to the extent of displacing all of the air (or other gas) in the foam. Examples of suitable foam include polyurethane foam and cellulose sponge. Polyethylene foam is unsatisfactory, as is carborundum ceramic foam (which is not a polymeric substance, of course). The preferred polymeric substance is a polyurethane foam of the polyether of polyester types.

The polyurethane foam suitable for the practice of this invention is preferably an open-celled foam having a density of about 1 to about 6 lb/ft$^3$. The foam density is primarily controlled by the volume of frothing agent used in making the foam. The term "open-celled" is intended to mean that the walls of some of the cells are discontinuous so that a portion, but not all, of the air entrapped therein can be replaced by liquid when the foam is immersed in a liquid. The closed cells constitute microspheres so that the foam itself can serve as the primer of the present invention. However early tests suggested that it is not reliably so, because attempts to detonate nitromethane with the foam alone frequently failed and the polymeric foam itself was therefore thought not to be a satisfactory primer.

Subsequent tests showed that the open-celled foam and the nitromethane in intimate contact therewith functioned satisfactorily as a primer provided a strong initiator was used. Although somewhat less powerful than the foam plus microspheres, the foam alone has several advantages. Ordinary commercial foams, some of which are available at retail can be used without the trouble and expense of incorporating microspheres therein. Suitable foams can be easily determined by tests with a small amount of nitromethane. Failure to initiate detonation indicates an unsatisfactory foam.

In use, a portion of about 1–3 cubic inches or more of the polymeric foam is attached to a detonating device, e.g. a detonating cord or a blasting cap, e.g. by threading it on the cap; or it can be packed into an aluminum tube or a capwell, then the cap or detonating cord is inserted. This assembly is immersed in the nitromethane and when the cap or cord is fired, the nitromethane detonates.

The invention will be better understood with reference to the following examples. It is understood, however, that the examples are intended for illustration only and it is not intended that the invention be limited thereby.

EXAMPLE 1

Four commercial foam materials, all made by E. I. du Pont de Nemours Corp., were purchased at retail outlets and tested for detonating nitromethane. They were identified as follows:
1. Carpet cushion, "Belmeade" Pneumacel.
2. Carpet cushion, "Lansdowne" Pneumacel.
3. Fine grain cellulose sponge with small holes intended primarily for photographic finishers.
4. "Miracle" cellulose sponge with small holes.

The results of the tests showed that nitromethane could be reliably detonated with the Belmeade foam and a No. 10 cap. Detonations were reliably obtained with the remaining three foams and a No. 8 cap.

EXAMPLE 2

Seven samples of polyurethane foam of varying densities were obtained from Tenneco Chemicals, Foam and Plastic Division, Valmont Park, Hazelton, Pa. These foams were prepared by reacting toluene diisocyanate (TDI) with a polyol, as set forth in the description in the following table 1. From each there was cut a 1 × 1 × 4-inch block. It was fitted into an aluminum capwell and immersed in an 8 oz. glass jar filled with nitromethane so that the foam was in intimate contact with the nitromethane. The minimum sized cap to reliably detonate the nitromethane was then determined. The results are given in table 2:

TABLE 2

| Foam No. | Minimum Cap |
|---|---|
| 1100 | 8 |
| 3500 | 10 |
| 3800 | 8 |
| 6273 | 10 |
| 8573 | 6 |
| 8673 | 6 |
| 7004 | 8 |

TABLE 1

| Foam No. | Description | Average Density lb/ft³ | ILD* lbs. | Resilience min., % | Tensile psi, min. | Elongation min.,% | Tear min. lb/in |
|---|---|---|---|---|---|---|---|
| 1100 | A soft polyether made from polypropylene oxide. | 1 | 7.0– 12.0 | 38 | 7.0 | 200 | 1.15 |
| 3500 | A medium firm polyether made from polypropylene oxide. | 1.25 | 28.0– 34.0 | 40 | 12.0 | 190 | 1.70 |
| 3800 | A very firm polyether made from polypropylene oxide. | 1.25 | 30.0– 38.0 | 40 | 11.0 | 150 | 1.0 |
| 6273 | Ester-type polyurethanes based on a hydroxy-terminated polyester obtained from adipic acid and diethylene glycol and further reacted with TDI; having carbon black as a filler and having cell counts (cells per linear inch), of 32–36, 55–70, and 55–70 respectively. | 2.0 | 45.0– 55.0 | 26 | 15.0 | 180 | 2.5 |
| 8573 | | 4.0 | 58.0– 65.0 | 34 | 16.0 | 175 | 1.5 |
| 8673 | | 6.0 | 75.0–100.0 | 40 | 16.0 | 175 | 1.4 |
| 7004 | A polyether with inert filler. | 3.75 | 25.0– 33.0 | 42 | 8.0 | 160 | 1.3 |

*Indentation Load Deflection

I claim:
1. A method for priming nitromethane to detonation by strong shock which comprises immersing in said nitromethane an open-celled polymeric foam having a blasting cap in close contact with said polymeric foam.
2. The method of claim 1 wherein said foam is a polyurethane having a density of from about 1 to about 6 pounds per cubic feet.
3. The method of claim 1 wherein said foam is a cellulose sponge.
4. An explosive system comprising a body of nitromethane containing therein an open-celled polymeric foam.
5. The explosive system of claim 4 wherein said polymeric foam is a polyurethane foam.
6. The explosive system of claim 4 wherein said polymeric foam is a cellulose sponge.

* * * * *

UNITED STATES PATENT OFFICE
CERTIFICATE OF CORRECTION

Patent No. 3,977,921          Dated August 31, 1976

Inventor(s)  Ollie Wayne Chandler

It is certified that error appears in the above-identified patent and that said Letters Patent are hereby corrected as shown below:

Column 4, claim 2, line 39, "polyurethane having" should read -- polyurethane foam having --

Signed and Sealed this twelfth Day of July 1977

[SEAL]

Attest:

RUTH C. MASON  
Attesting Officer

C. MARSHALL DANN  
Commissioner of Patents and Trademarks